Aug. 16, 1960

H. HAINES 2,949,189

CONICAL ELEMENT FOR SIZING ROLL

Filed Dec. 11, 1957

INVENTOR
HAROLD HAINES

BY

ATTORNEY

United States Patent Office 2,949,189
Patented Aug. 16, 1960

2,949,189
CONICAL ELEMENT FOR SIZING ROLL
Harold Haines, 243 Main St., Presque Isle, Maine
Filed Dec. 11, 1957, Ser. No. 702,119
1 Claim. (Cl. 209—106)

The present invention in general pertains to apparatus for classifying fruits and vegetables such as potatoes according to size and more particularly relates to improvements in the cone shaped elements which when assembled in pairs provide improved sizing rolls in machines for classifying fruit and vegetables.

The prior art includes rubber cone shaped elements assembled in pairs on a shaft to provide a sizing roll. The cone shaped elements previously employed for such purpose have been provided with a plurality of projections formed of rubber which extends from the exterior surface of the rubber cone so as to provide resilient bristles or the like for engaging the fruit or vegetables undergoing classification. Such cone elements have a tendency to bruise and even rupture the skin of the fruit and particularly new potatoes. It is accordingly an object of the present invention to provide improvements in the active face of the cone elements making up a sizing roll so as to provide for gentle handling of the fruit and vegetables moving into engagement with the sizing roll and to provide a flexible and resilient structure adjacent the larger diameter end of the cone which will avoid damage to fruit and vegetables and at the same time provide for cleaning and sizing.

A further object of the invention is to provide a plurality of radially disposed resilient and flexible ribs on the active face of each cone element which terminate in scalloped ends near the outer periphery of the large diameter end of the cone element to reduce the bruising or the tendency of the sizing roll to rupture the skin of fruit or vegetables such as new potatoes undergoing cleaning and classification.

Other objects and features of the invention will be appreciated and become apparent as the present disclosure proceeds and upon consideration of the accompanying drawing and the following detailed description wherein an exemplary embodiment of the invention is disclosed.

Figure 1:
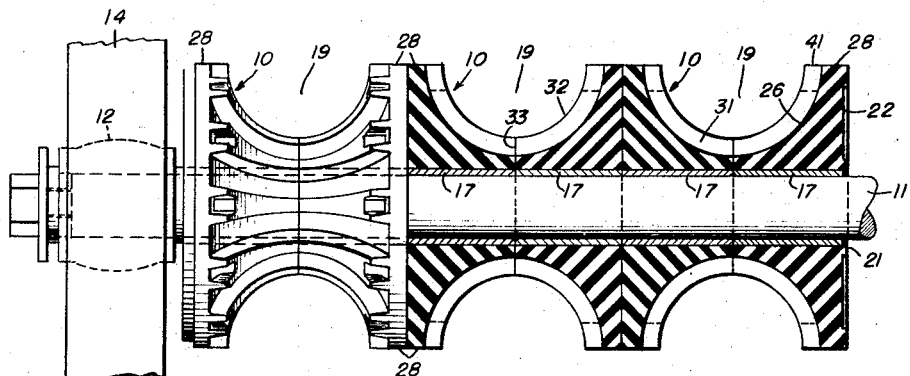
Fig. 1 is a fragmentary elevational view of a fruit or vegetable sizing role with several of the pairs of the cone elements shown in section.

A portion of a roll for sizing or classifying fruit and vegetables is shown in Fig. 1. Such a roll is formed of a plurality of cone shaped elements 10 mounted on a shaft 11 which may be journalled for rotation in bearings one of which is indicated at 12 and supported by a frame element 14 of the apparatus. The invention pertains to the structure making up the active face or profile of the cone elements which are arranged in pairs on the shaft 11. Other parts of the classifying apparatus may be of a conventional construction.

Each cone element 10 is formed of rubber or similar material and includes a body portion 16 which is bonded to a metal bushing 17. The body portion 16 is formed to provide a small diameter end face 18 which is substantially flush with an end of the bushing 17. The structure of each cone element is such that when two are arranged with the small diameter end faces 18 in abutting relationship as shown in Fig. 1 a concave shaped annular groove 19 is provided between the confronting cone elements 10. The body 16 of each cone element is provided with an end face 21 which is disposed at right angle to the axis of the bushing 17. The large diameter end face 21 may be provided with an annular channel 22 so that when the cones are arranged in pairs and clamped in abutting relationship as shown in Fig. 1 the periphery of the faces 21 will lie in close fitting engagement to avoid entrance of dirt or other debris between the large diameter ends of the cone elements.

Figure 3:
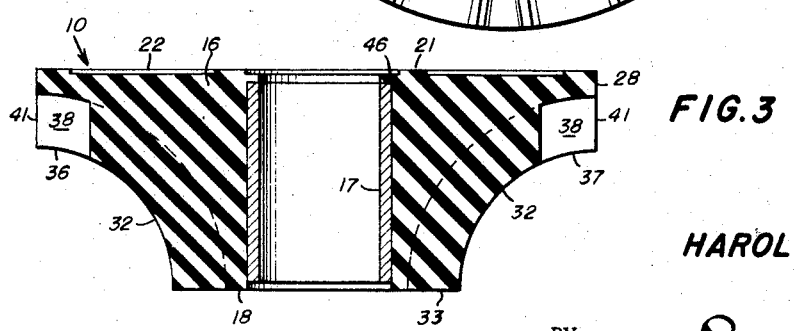
Fig. 3 is a sectional view taken on the line 3—3 of Fig. 2.

The outer surface 26 of each cone element 10 between the ribs 31 thereon is of general frusto-conical shape and is more specifically of arcuate configuration in proceeding from the small diameter end face 18 to the large diameter end of the body. The arcuate surface 26 does not extend to the face 21 so as to provide continuous cylindrical surface 28 adjacent the large diameter end of the cone element as best shown in Fig. 3.

The radially extending ribs 31 are formed integral with the body portion 16. The ribs 31 are circumferentially spaced from each other providing radially disposed channels between the ribs. Each rib 31 has a concave free edge 32 which is substantially parallel to the arcuate outer surface 26 of the body portion 16. The ribs 31 terminate at the small diameter end of the cone element flush with the end face 18 so that each rib has an end surface 33 which is at right angles to the axis of the opening in the bushing 17.

Figure 2:
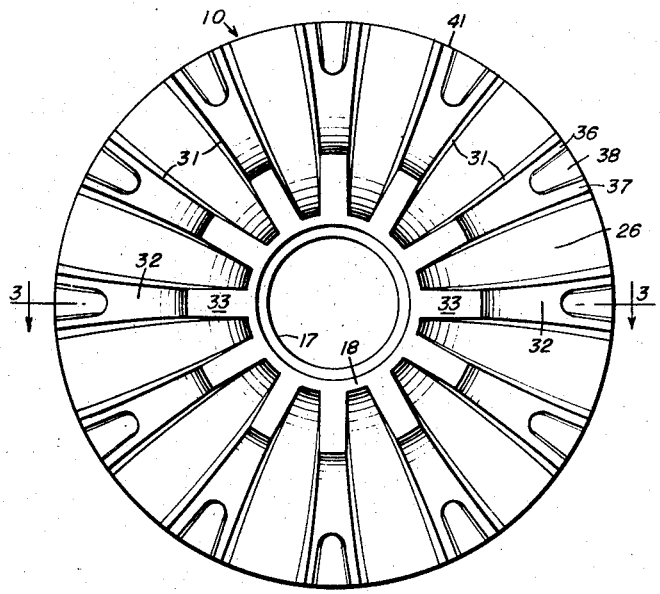
Fig. 2 is an enlarged elevational view of a cone element exhibiting the invention.

Each rib 31 near the large diameter end of the cone element is of bifurcated construction and includes circumferentially spaced arms 36 and 37 as best shown in Fig. 2. An open area 38 is provided between each set of arms 36 and 37. The absence of the resilient material as provided by the areas 38 adjacent the larger diameter end of the cone element provides for the reduction of rigidity of the ribs and provides a more flexible rib structure near the base end of the cone element. The arms 36 and 37 are more readily deformed by the fruit and vegetables undergoing classification to avoid rupturing the skin thereof or bruising the fruit and vegetables. The ends of the arms 36 and 37 terminate in surfaces 41 which are flush with the cylindrical surface 28.

The cone elements are arranged in pairs with the small diameter ends in abutting relationship as shown in Fig. 1. A plurality of such pairs of cones are arranged on the shaft 11 so that the larger diameter ends of the cone elements are also in abutting relationship. The annular channels 22 in the larger diameter end faces 21 of the cone elements makes it possible for the base ends to be clamped in close fitting abutting relationship and the cone elements may be maintained in such assembled relationship and secured to the shaft 11 so as to be driven thereby in any suitable manner. Each cone element is recessed at 46 so that when they are clamped together the metal bushing 17 will not prevent close fitting of the end faces of the cone elements.

In operation a sizing roll such as shown at Fig. 1 and others where the cone elements are of different dimensions may be driven to move fruit or vegetables over the active faces of the rolls. The rotation of the sizing rolls transports the fruit or vegetables over the rolls so that the dirt is dislodged therefrom. The vegetables or fruit eventually pass through the openings provided between the spaced sizing rolls made up of cone elements as herein described so as to provide for classification of the fruit or vegetables. The larger diameter ends of the cones engage the fruit or vegetables and the bifurcated construction of the ribs 31 providing improvements in the flexibility of the ribs at the larger diameter ends of the cones to prevent scarring or bruising of the fruit or vegetables or rupturing of the skin particularly of new potatoes or the like.

The size of the cones may be varied and changes may be made in the ribs or structure making up the active face of each cone element. The cone elements may be formed of various resilient materials and other changes may be made without departing from the spirit and scope of the invention as set forth in the appended claim.

What I claim and desire to secure by Letters Patent is:

A cone-shaped element for a sizing roll comprising, a body portion formed of resilient material having a small diameter end and a large diameter end, said body portion having a cylindrical opening therethrough extending from the large diameter end to the small diameter end, a generally conical outer surface on said body portion, a cylindrical peripheral surface on said body portion adjacent said large diameter end, an annular exterior concave surface on said body portion extending from said small diameter end to said cylindrical peripheral surface, circumferentially spaced radially disposed ribs integral with the body portion extending from the small diameter end of the body portion along said exterior surface, bifurcated arms forming the end of each of said ribs adjacent the large diameter end of said body portion, said bifurcated arms terminaitng flush with said cylindrical peripheral surface, an open area between said bifurcated arms unobstructed outwardly from said concave surface, and the free edges of said ribs and the free edges of the bifurcated arms being of concave shape substantially parallel to said annular exterior concave surface.

References Cited in the file of this patent

UNITED STATES PATENTS

| | | |
|---|---|---|
| 2,244,546 | Stockdale | June 3, 1941 |
| 2,266,506 | Morse | Dec. 16, 1941 |
| 2,335,164 | Wayland | Nov. 23, 1943 |
| 2,588,309 | Troyer | Mar. 4, 1952 |